April 17, 1934.  E. RUPP  1,955,564

ELECTRIC CURRENT RECTIFIER

Filed Oct. 11, 1932

Inventor:
Emil Rupp,
by Harry E. Dunham
His Attorney.

Patented Apr. 17, 1934

1,955,564

UNITED STATES PATENT OFFICE

1,955,564

ELECTRIC CURRENT RECTIFIER

Emil Rupp, Berlin-Frohnau, Germany, assignor to General Electric Company, a corporation of New York Application October 11, 1932, Serial No. 637,355
In Germany October 14, 1931

14 Claims. (Cl. 175—366)

My invention relates to electric current rectifiers of the dry plate or contact type, particularly to rectifiers of this type comprising metallic elements having an active layer formed thereon constituted by an oxide of the metallic element, and has for its principal object the provision of a rectifier of high efficiency in which the active layer is constituted by a tungsten oxide formed on a tungsten element.

I have found that the blue tungsten oxide which may be formed on tungsten metal at high temperatures possesses a high rectifying effect. In accordance with my invention such a rectifying substance is used in the making of dry rectifiers.

The method of making the tungsten oxide rectifier in accordance with my invention consists in heating blank tungsten at temperatures of 800° to 1200° C. in an oxygen-containing atmosphere for a certain time. The blue tungsten oxide which is formed in this case has (in contrast to the yellow tungsten oxide) a very pronounced rectifier effect. Unlike other rectifier substances, this substance has a very slight internal resistance, and the rectified currents are therefore very high.

My invention will be better understood from the following description when considered in connection with the accompanying drawing and its scope will be pointed out in the appended claims.

Figure 1:
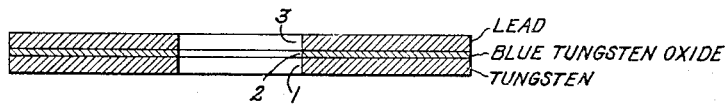
Figure 2:
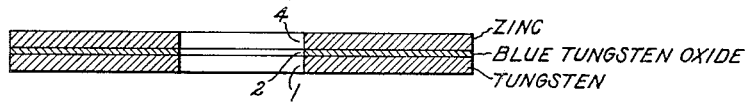
Figure 3:
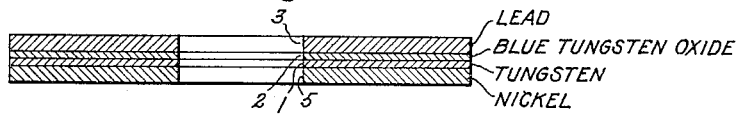
Figure 4:
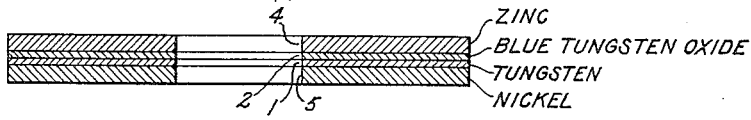

Referring to the drawing, Fig. 1 is a cross-sectional view of a rectifier of the dry plate type in accordance with my invention, and Figs. 2 to 4 are cross-sectional views of modifications of the invention.

In Fig. 1 the rectifier unit of the dry plate type comprises a tungsten element or plate 1, having thereon an active layer 2 of blue tungsten oxide, and a conductive element or plate 3 in contact with the oxide layer. In the present embodiment of my invention the latter element or plate is formed of lead.

In Fig. 2 the rectifier unit is the same as the unit illustrated in Fig. 1 except that in Fig. 2 the conductive element or plate 4 in contact with the oxide layer is formed of zinc.

In Figs. 3 and 4 the rectifier units are the same as illustrated in Figs. 1 and 2 respectively except that in Figs. 3 and 4 the tungsten element 1 is in the form of a layer on a supporting sheet 5 of nickel or other suitable material.

Following is a description of a few of the special methods which I have found suitable for the production of the blue tungsten-oxide layer:

1. Blank tungsten in sheet form may be heated in air at 950° C. and for a few minutes (three to five for example), after which the tungsten is quenched in water. The quenching makes it possible to obtain the blue layer alone, without the yellow oxide. The quenching itself can take place in heated water, or in heated as well as in cold oil.

2. Blank tungsten in sheet form may be heated as in case 1 above, in a stream of nitrogen and in a carbon-dioxide stream, after which it may be cooled in a stream of carbon-dioxide.

3. Blank tungsten in sheet form may be heated in oxygen at a reduced pressure, after which it is quenched.

4. After undergoing any one of the processes described under cases 1 to 3 above, the blue layer may be tempered or treated at 300° to 600° C. in an atmosphere which contains a slight amount of oxygen, for instance carbon dioxide.

It is to be noted that the tungsten sheets may be formed in any suitable shape; for example, the sheets may be cut into rings.

When making rectifiers in accordance with my invention the parent metal sheet of oxide-coated tungsten serves as one electrode, and the other electrode may be made of any other metal. Lead and zinc are quite appropriate for the latter purpose since they may be sprayed on to the oxide-coated tungsten sheet. The metal deposit constituting this other electrode may be also of electrolytic nature.

In order to prevent a further oxidation of the blue tungsten layer, reducing media may be used such as lead oxide and graphite.

Instead of using solid tungsten sheets, another metal may be employed as a supporting sheet. For example nickel sheets may be employed which may be plated with tungsten, the tungsten layer then being oxidized to form the active layer thereon.

It is to be noted that the rectifying layer exhibits also a photo-electric sensitivity and may be used as a "back-wall" as well as a "front-wall" photocell.

What I claim as new and desire to secure by Letters Patent of the United States is:

1. The process of forming a dry rectifier which includes heating tungsten to a relatively high temperature to form blue tungsten oxide thereon, and quenching said layer in water.

2. The process of forming a dry rectifier which includes heating tungsten to a relatively high temperature to form a layer of blue tungsten oxide thereon, and quenching said layer in oil.

3. The process of forming a dry rectifier which includes heating sheet tungsten in air for a few minutes at 900° C. to 1000° C. to form blue tungsten oxide on said tungsten, and quenching said tungsten.

4. The process of forming a dry rectifier which includes heating tungsten to a relatively high temperature in a mixture of nitrogen and carbon dioxide to form blue tungsten oxide on said tungsten.

5. The process of forming a dry rectifier which includes heating tungsten at temperatures between 300° C. and 600° C. to form a blue tungsten layer on said tungsten, and tempering said layer in an atmosphere having a relatively slight oxygen content.

6. The process of forming a dry rectifier which includes heating tungsten to a relatively high temperature in oxygen at reduced pressure.

7. A dry plate rectifier comprising a tungsten element having thereon a layer of blue tungsten oxide, and a metallic element in contact with said oxide layer.

8. A dry plate rectifier comprising a tungsten element having thereon a layer of blue tungsten oxide, and a lead element in contact with said oxide layer.

9. A dry plate rectifier comprising a tungsten element having thereon a layer of blue tungsten oxide, and a zinc element in contact with said oxide layer.

10. A dry plate rectifier comprising a tungsten element, a supporting element of another material for said tungsten element, a layer of blue tungsten oxide on said tungsten element, and a metallic element in contact with said oxide layer.

11. A dry plate rectifier comprising a tungsten element, a supporting element of another material for said tungsten element, a layer of blue tungsten oxide on said tungsten element, and a lead element in contact with said oxide layer.

12. A dry plate rectifier comprising a tungsten element, a supporting element of another material for said tungsten element, a layer of blue tungsten oxide on said tungsten element, and a zinc element in contact with said oxide layer.

13. A dry plate rectifier comprising a tungsten element, a supporting element of nickel for said tungsten element, a layer of blue tungsten oxide on said tungsten element, and a lead element in contact with said oxide layer.

14. A dry plate rectifier comprising a tungsten element, a supporting element of nickel for said tungsten element, a layer of blue tungsten oxide on said tungsten element, and a zinc element in contact with said oxide layer.

EMIL RUPP.